United States Patent
Arikai et al.

(10) Patent No.: US 9,863,334 B2
(45) Date of Patent: Jan. 9, 2018

(54) DRIVE CONTROL APPARATUS FOR PRIME MOVER

(71) Applicant: HONDA MOTOR CO., LTD., Tokyo (JP)

(72) Inventors: Tatsuya Arikai, Wako (JP); Shinobu Ochiai, Wako (JP); Naoki Tsuji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 17 days.

(21) Appl. No.: 14/897,391

(22) PCT Filed: Oct. 15, 2014

(86) PCT No.: PCT/JP2014/077392
§ 371 (c)(1),
(2) Date: Dec. 10, 2015

(87) PCT Pub. No.: WO2015/072269
PCT Pub. Date: May 21, 2015

(65) Prior Publication Data
US 2016/0138494 A1   May 19, 2016

(30) Foreign Application Priority Data

Nov. 13, 2013  (JP) .................................. 2013-234547
Apr. 8, 2014   (JP) .................................. 2014-079645

(51) Int. Cl.
*F02D 29/02*   (2006.01)
*F02D 41/22*   (2006.01)
(Continued)

(52) U.S. Cl.
CPC ............ *F02D 29/02* (2013.01); *F02D 11/107* (2013.01); *F02D 41/0215* (2013.01);
(Continued)

(58) Field of Classification Search
CPC .... F02D 29/02; F02D 11/107; F02D 41/0215; F02D 41/045; F02D 41/22; F02D 41/18;
(Continued)

(56) References Cited

U.S. PATENT DOCUMENTS 6,125,322 A     9/2000  Bischof et al.
6,397,152 B1 *  5/2002  Kalweit ............. F02D 41/1497
                                              702/105

(Continued)

FOREIGN PATENT DOCUMENTS

JP   2005-522617 A    7/2005
JP      3955328 B2    8/2007
JP   2011-052696 A    3/2011

OTHER PUBLICATIONS

International Search Report dated Feb. 3, 2015 corresponding to International Patent Application No. PCT/JP2014/077392 and English translation thereof.

*Primary Examiner* — Joseph Dallo
*Assistant Examiner* — Kurt Liethen
(74) *Attorney, Agent, or Firm* — Squire Patton Boggs (US) LLP

(57) ABSTRACT

A drive control apparatus in which the target torque which is a target value of an output torque of the prime mover for driving a vehicle, is calculated, and the output torque control is performed so that the output torque of the prime mover coincides with the target torque, is provided. An estimated output torque which is an estimated value of the actual output torque of the prime mover, is calculated, and the torque difference accumulated value which approximates a time-integration value of a torque difference between the target torque and the estimated output torque, is calculated. It is determined that an abnormality has occurred in the output torque control when the torque difference accumu- (Continued)

lated value exceeds a determination threshold value which is set to a constant value.

16 Claims, 10 Drawing Sheets

(51) Int. Cl.
| | | |
|---|---|---|
| *F02D 41/02* | (2006.01) | |
| *F02D 41/04* | (2006.01) | |
| *F02D 11/10* | (2006.01) | |
| *F02D 41/18* | (2006.01) | |

(52) U.S. Cl.
CPC ........... *F02D 41/045* (2013.01); *F02D 41/22* (2013.01); *F02D 41/18* (2013.01); *F02D 2200/0404* (2013.01); *F02D 2200/1004* (2013.01); *F02D 2200/602* (2013.01); *F02D 2250/18* (2013.01); *Y02T 10/40* (2013.01)

(58) Field of Classification Search
CPC ......... F02D 2250/18; F02D 2200/0404; F02D 2200/602; F02D 2200/1004; Y02T 10/40
See application file for complete search history.

(56) References Cited

U.S. PATENT DOCUMENTS

| | | | | |
|---|---|---|---|---|
| 6,445,083 | B2* | 9/2002 | Gohring | ................. B60R 25/04 307/10.2 |
| 6,487,489 | B2* | 11/2002 | Schmitt | ................. B60K 28/16 123/333 |
| 7,612,464 | B2* | 11/2009 | Yano | ..................... F02D 11/107 307/10.1 |
| 2002/0143459 | A1* | 10/2002 | Oota | ................... F02D 35/0023 701/104 |
| 2005/0172930 | A1 | 8/2005 | Pitzal et al. | |
| 2009/0327821 | A1* | 12/2009 | Bauerle | ............. B60W 50/0205 714/704 |
| 2010/0036558 | A1* | 2/2010 | Murakami | ......... B60W 30/188 701/31.4 |
| 2015/0360694 | A1* | 12/2015 | Tunhag | ................ B60W 10/04 701/99 |

* cited by examiner

[FIG. 1]
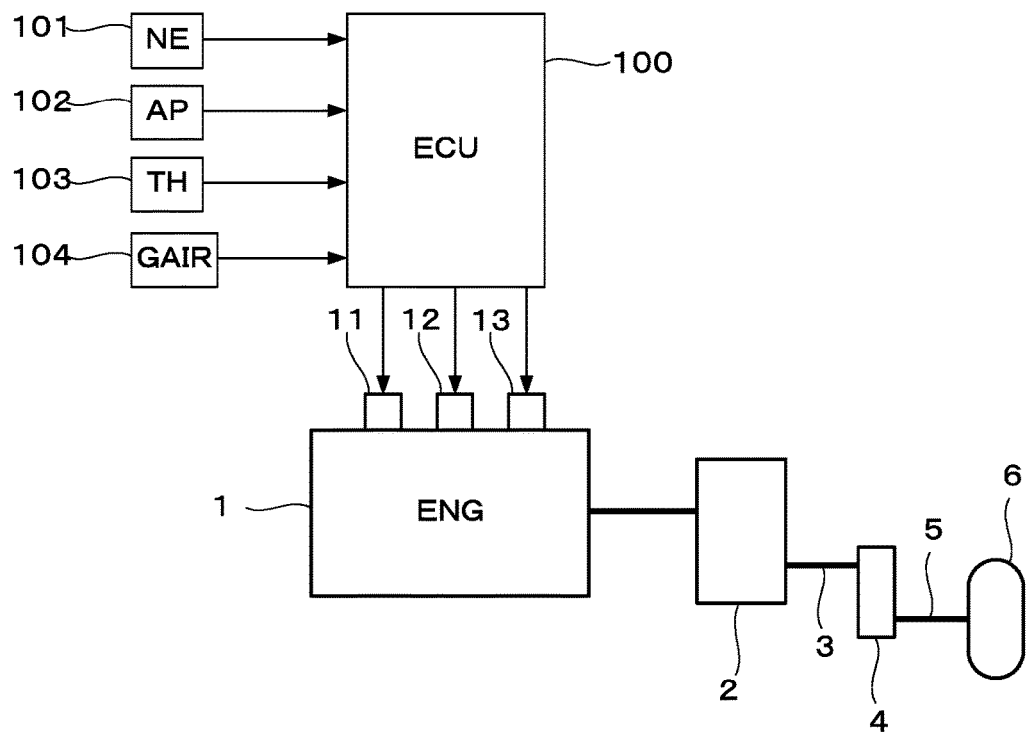
[FIG. 2]
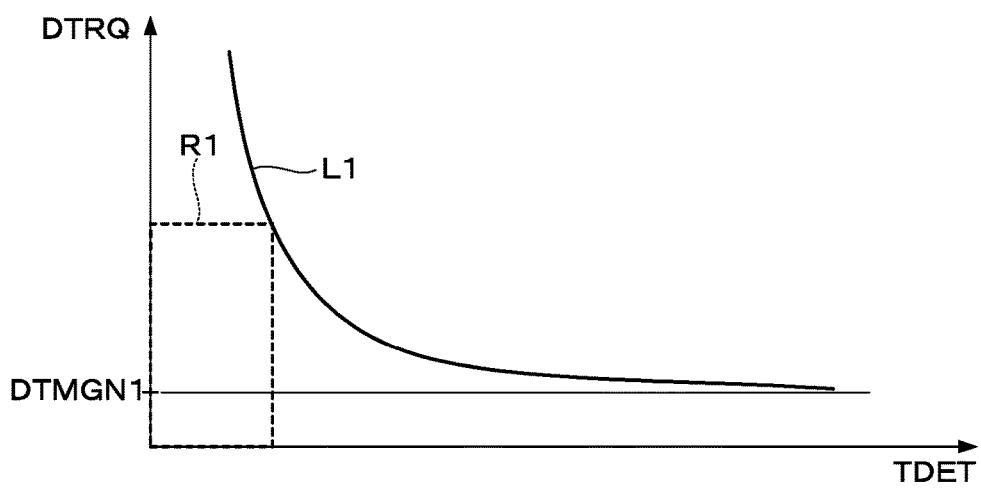

[FIG. 3]
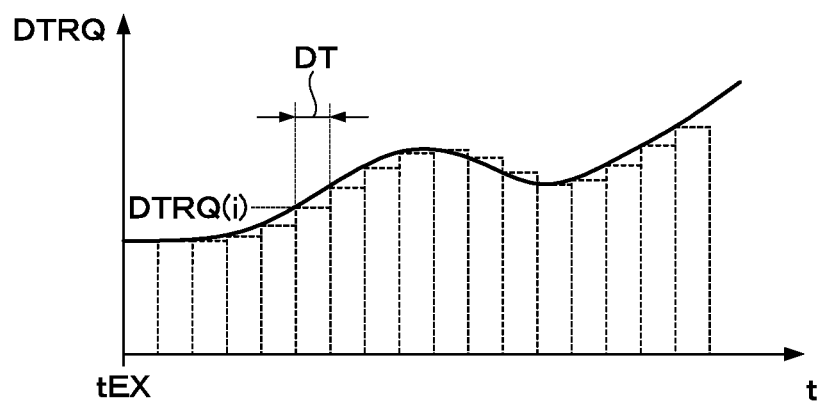
[FIG. 4]
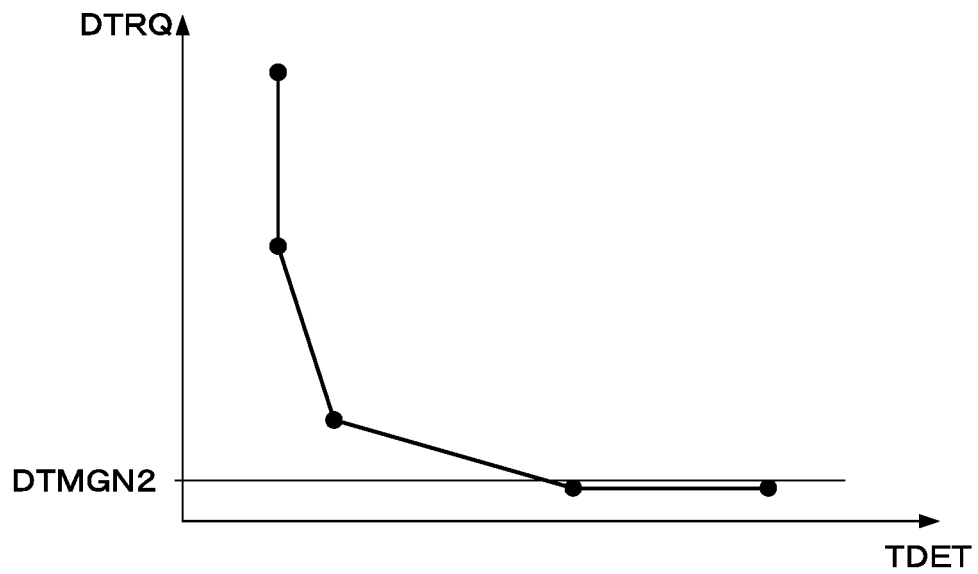

[FIG.5]
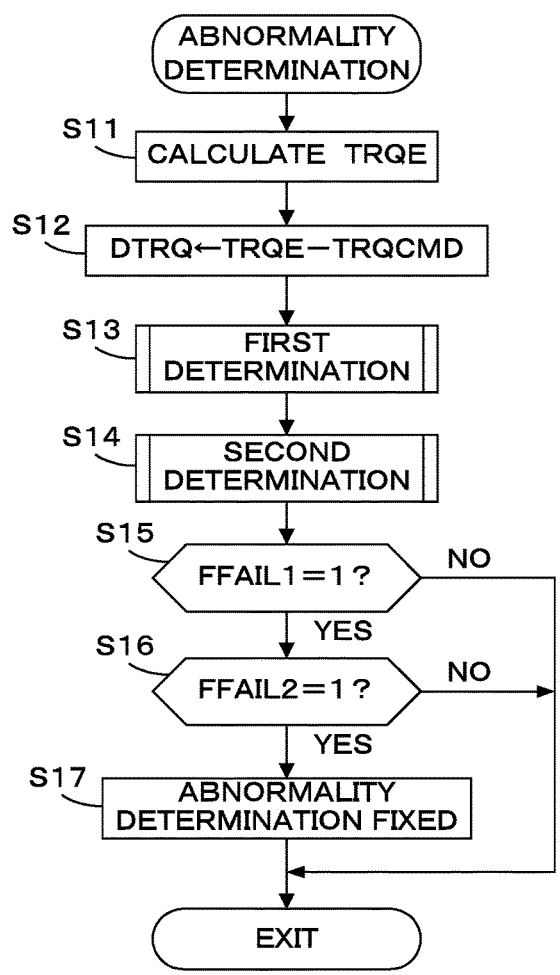
[FIG. 6]
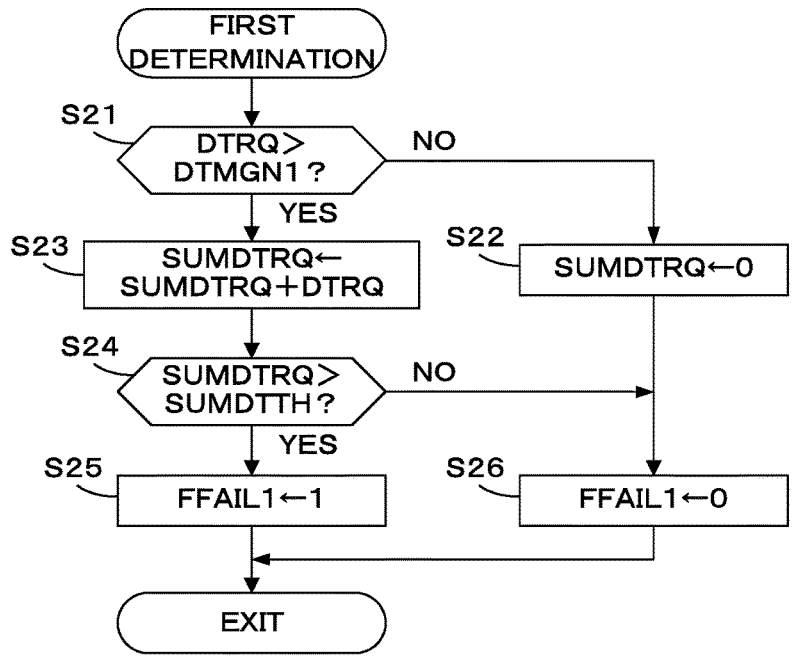

[FIG. 7]
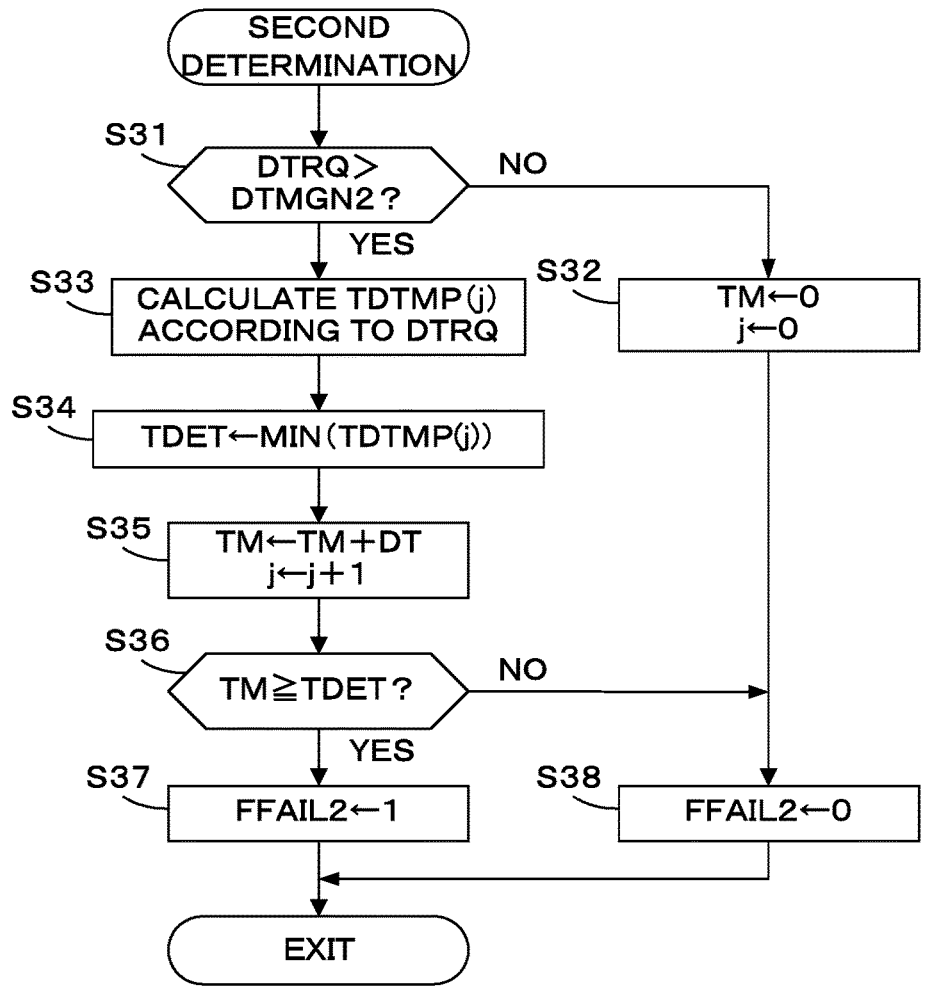

[FIG. 8]
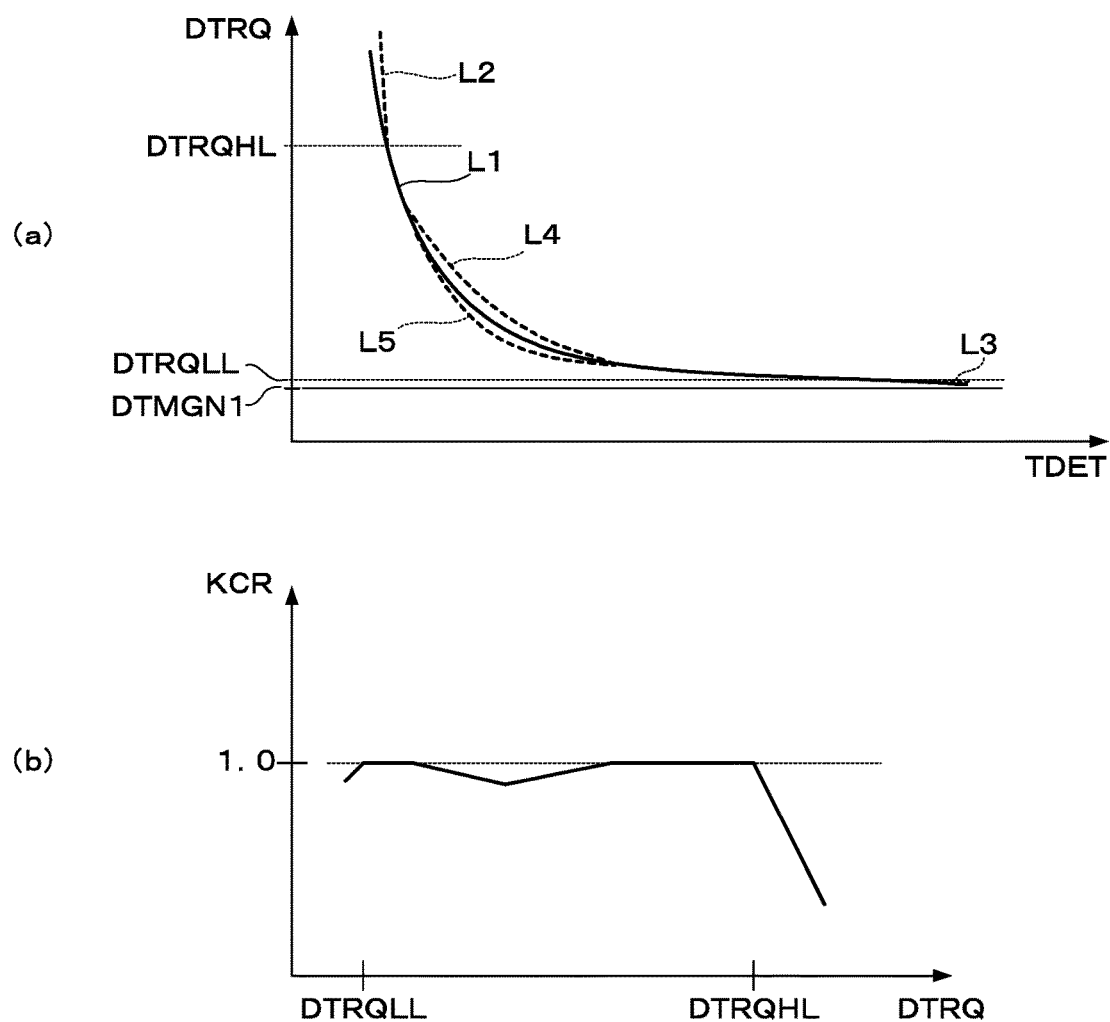

[FIG. 9]
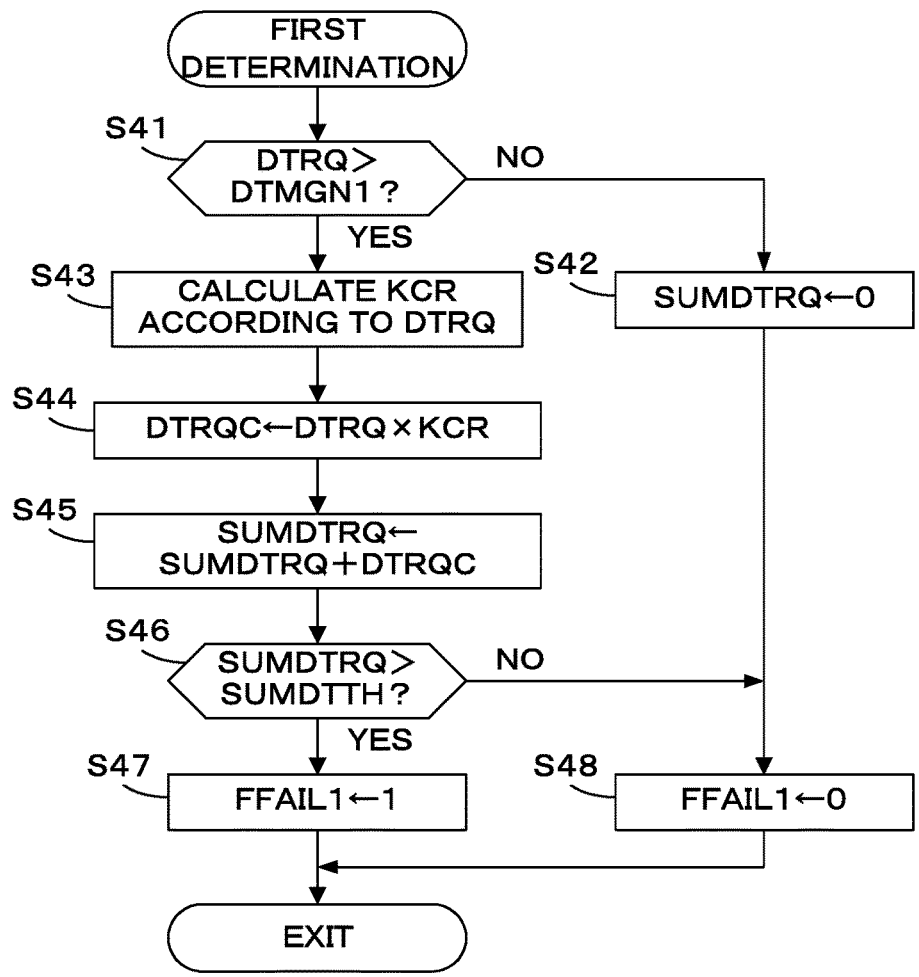

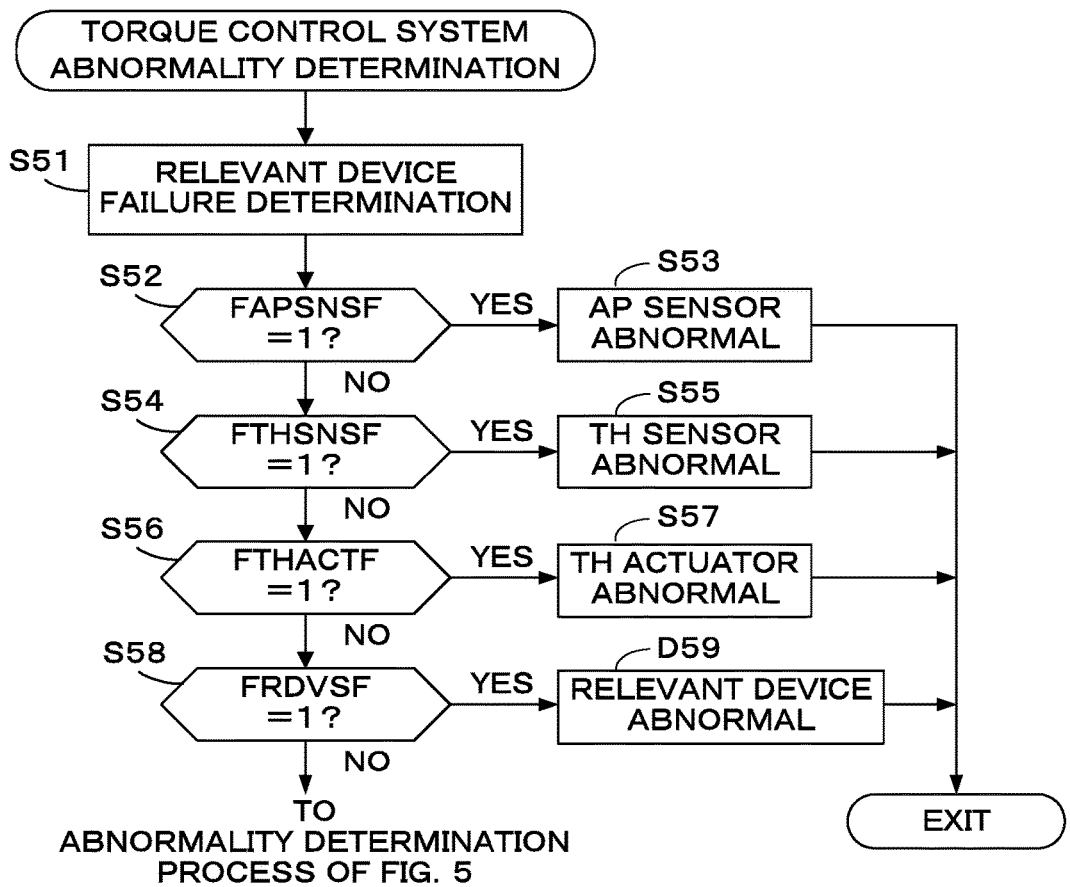

[FIG. 11]
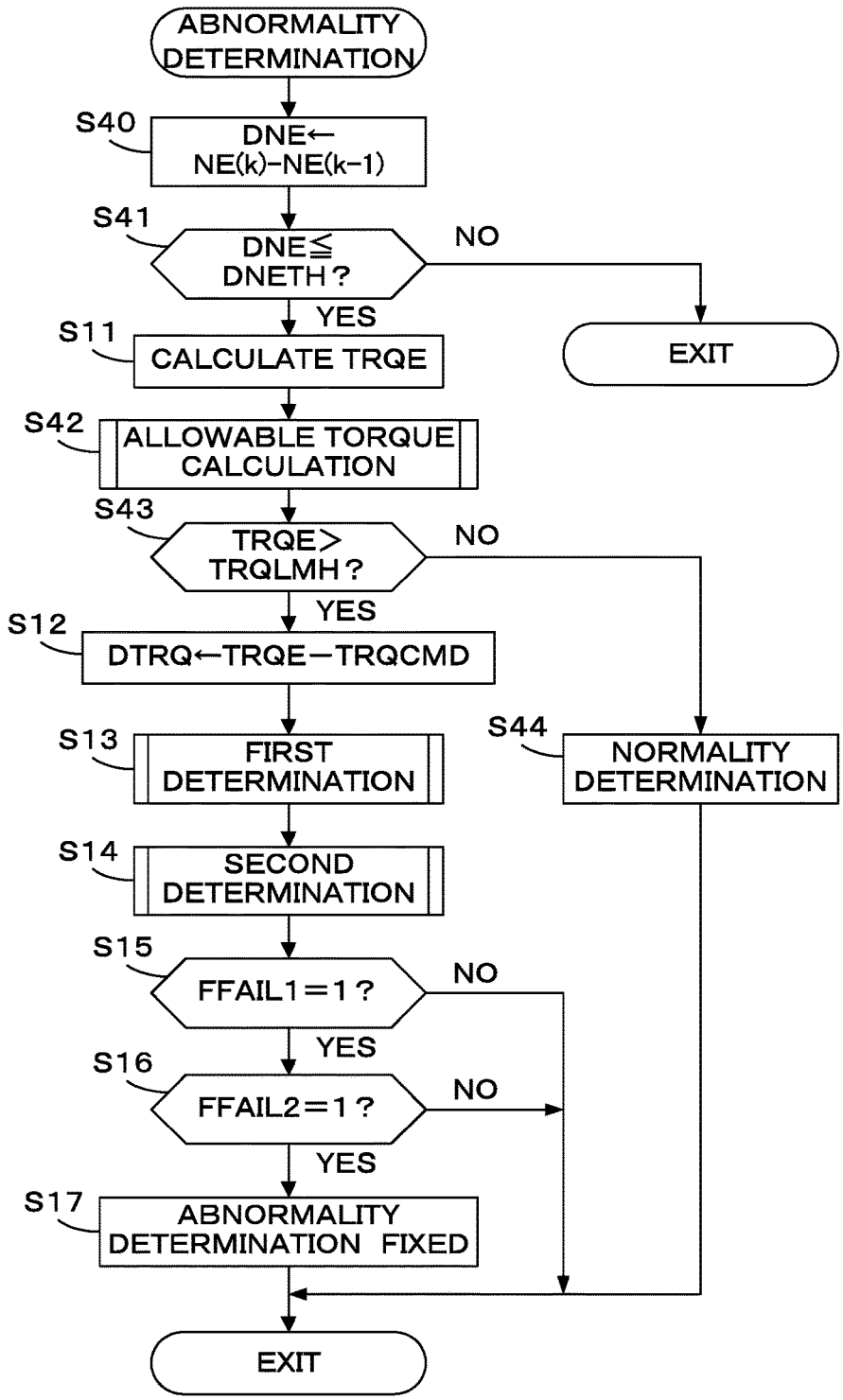

[FIG. 12]
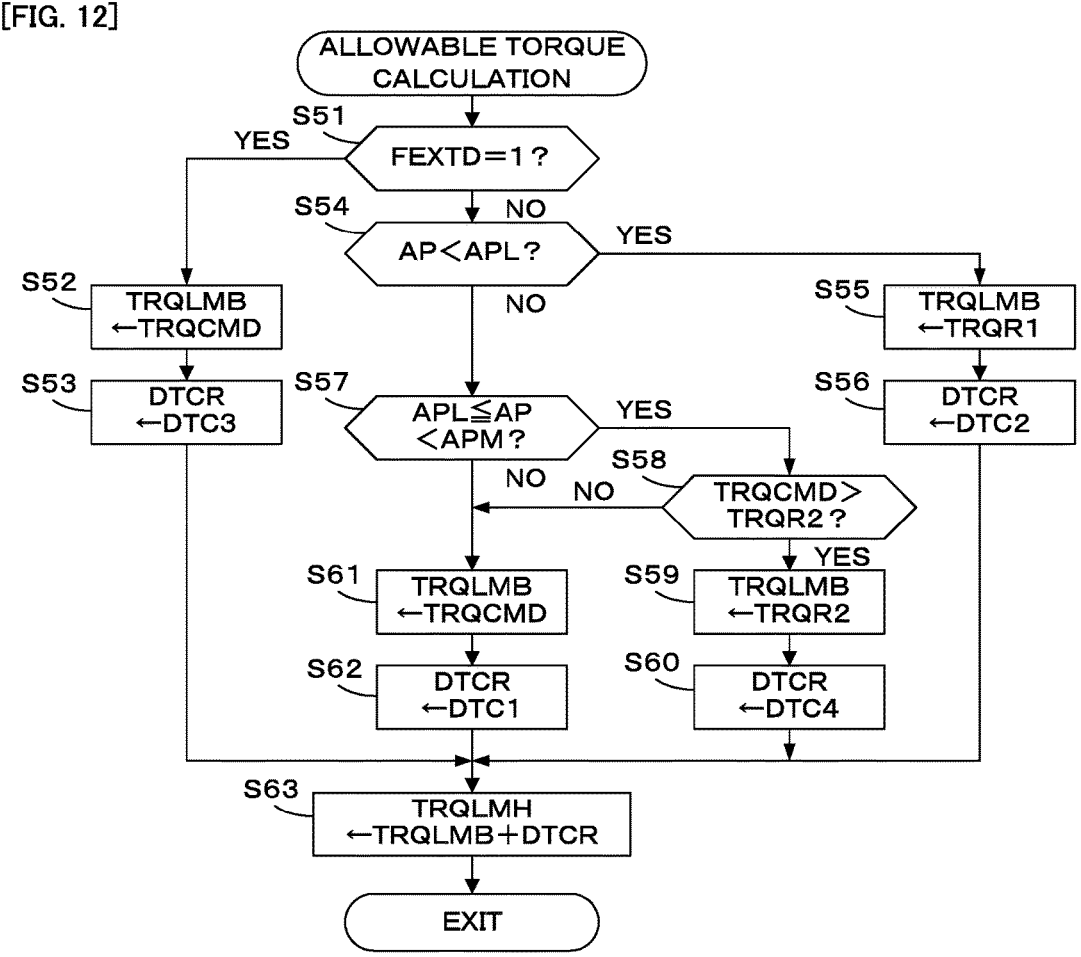
[FIG. 13]
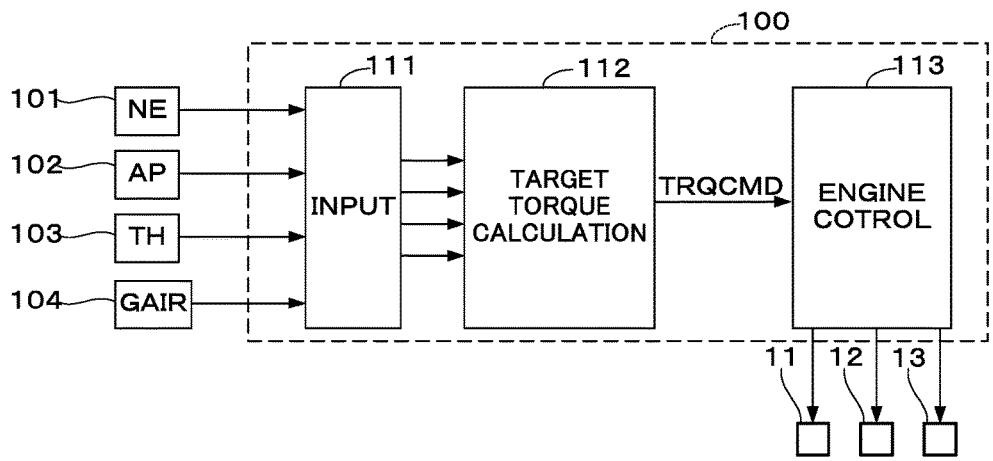

[FIG. 14]
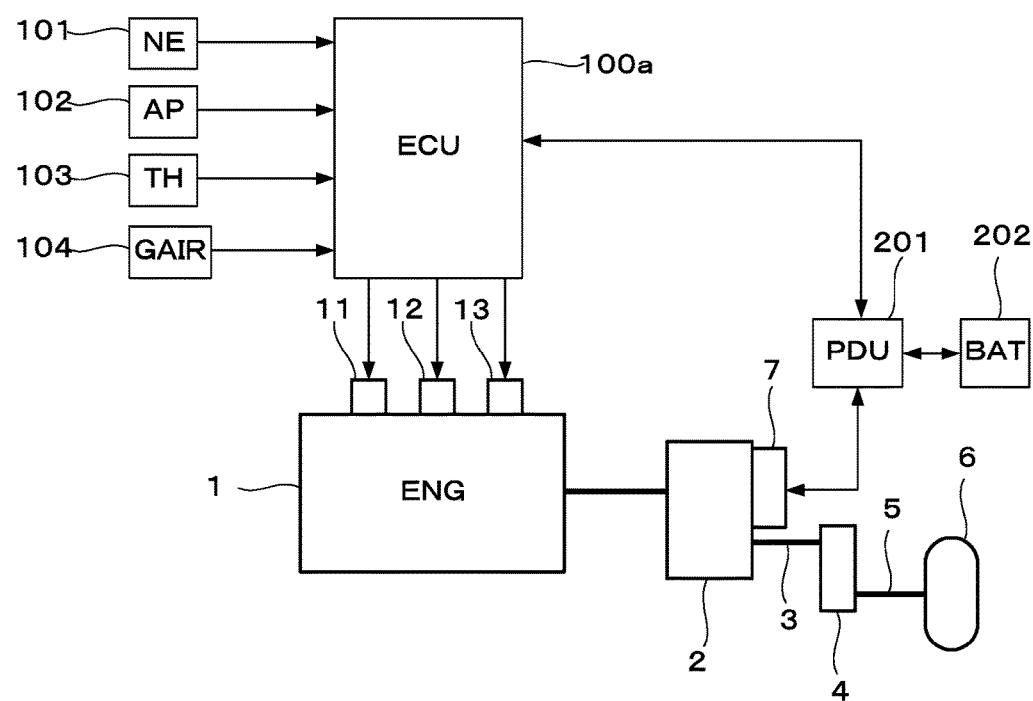

US 9,863,334 B2

DRIVE CONTROL APPARATUS FOR PRIME MOVER

TECHNICAL FIELD

The present invention relates to a drive control apparatus for a prime mover, such as an internal combustion engine or an electric motor for driving a vehicle, and particularly to a drive control apparatus which has a function to determine an abnormality in the output torque control of the prime mover.

BACKGROUND ART

Patent document 1 (shown below) shows a control apparatus for a vehicle drive unit having an abnormality determination function. According to this apparatus, it is determined that an abnormality has occurred if a time period in which an actual torque (an estimated output torque calculated from the intake air flow rate, the ignition timing, etc.) is greater than an allowable torque exceeds a predetermined time period.

PRIOR ART DOCUMENT

Patent Document

Patent Document 1: Japanese Patent Publication No. 3955328

SUMMARY OF THE INVENTION

Problems to be Solved by the Invention

In the apparatus shown in Patent document 1, the predetermined time period applied to the abnormality determination is set to a constant value regardless of a torque difference between the estimated output torque and the allowable torque. Accordingly, there is a problem that when the predetermined time period is comparatively short, an erroneous determination may easily be made if the torque difference is comparatively small, while when the predetermined time period is comparatively long, the time period necessary for determining the abnormality may become long even if the torque difference is comparatively large.

The present invention was made contemplating the above-described point, and an objective of the present invention is to provide a drive control apparatus which is able to accurately perform the abnormality determination in a determination time period suitable to a magnitude of the torque difference between the actual output torque (estimated output torque) and its control target value.

Solution to the Problem

To attain the above objective, the present invention provides a drive control apparatus for a prime mover (1), including output torque control means for calculating a target torque (TRQCMD) which is a target value of an output torque of the prime mover for driving a vehicle, and performing an output torque control so that the output torque of the prime mover coincides with the target torque, and abnormality determining means for determining an abnormality of the output torque control means. The present invention is characterized by including estimated output torque calculating means for calculating an estimated output torque (TRQE) which is an estimated value of an actual output torque of the prime mover, and torque difference accumulated value calculating means for calculating a torque difference accumulated value (SUMDTRQ) which approximates a time-integration value of a torque difference (DTRQ) between the target torque (TRQCMD) and the estimated output torque (TRQE), wherein the abnormality determining means includes first determining means for determining that an abnormality has occurred in the output torque control means when the torque difference accumulated value (SUMDTRQ) exceeds a determination threshold value (SUMDTH) which is set to a constant value.

With this configuration, the target torque which is a target value of an output torque of the prime mover for driving a vehicle, is calculated, and the output torque control is performed so that the output torque of the prime mover coincides with the target torque. The estimated output torque which is an estimated value of the actual output torque of the prime mover, is calculated, the torque difference accumulated value which approximates a time-integration value of the torque difference between the target torque and the estimated output torque, is calculated, and it is determined that an abnormality has occurred in the output torque control means when the torque difference accumulated value exceeds the determination threshold value which is set to a constant value. The torque difference accumulated value is a parameter which is substantially proportional to a product (an impulse=a change amount of the momentum) of an excessive drive force and a time period during which the excessive drive force acts on the vehicle, the excessive drive force corresponding to a part of the drive force generated by the prime mover which exceeds the target value. That is, the torque difference accumulated value reaches the determination threshold value in a less time period as the excessive drive force (the torque difference) becomes larger. Accordingly, the abnormality determination can be performed promptly in a state where the excessive drive force is large. On the other hand, in a state where the excessive drive force is comparatively small, high determination accuracy can be obtained by making a determination of abnormality occurrence after a long monitoring period. Further, when the excessive drive force changes after the excessive drive force is generated, the change is reflected to the torque difference accumulated value. Accordingly, even when the excessive drive force changes in the monitoring period (the period from the time the excessive drive force is generated to the time the determination of abnormality occurrence is made), it is possible to appropriately perform the determination corresponding to the change in the excessive drive force.

Preferably, the drive control apparatus further includes correction coefficient calculating means for calculating a correction coefficient (KCR) according to the torque difference (DTRQ), the correction coefficient (KCR) being relative to a characteristic of a drive power train (2, 3, 4, 5) which transmits the output torque of the prime mover to driving wheels of the vehicle, and correcting means for calculating a corrected torque difference (DTRQC) by multiplying the correction coefficient (KCR) with the torque difference (DTRQ), wherein the torque difference accumulated value calculating means calculates the torque difference accumulated value (SUMDTRQ) by accumulating the corrected torque difference (DTRQC).

With this configuration, the correction coefficient relative to the characteristic of the drive power train which transmits the output torque of the prime mover to the driving wheels of the vehicle, is calculated according to the torque difference, the corrected torque difference is calculated by multiplying the correction coefficient with the torque difference, and the torque difference accumulated value is calculated by accumulating the corrected torque difference. By applying the correction coefficient relative to the characteristic of the drive power train, the torque difference accumulated value to which the characteristic of the drive power train is reflected, is obtained. Accordingly, it is possible, for example, to perform a correction that contribution of the torque difference to the torque difference accumulated value is decreased as the torque difference decreases, which consequently makes it possible to appropriately set a balance between the time period necessary to perform the abnormality determination and the determination accuracy, corresponding to the characteristic of the drive power train.

Preferably, the correction coefficient (KCR) is set to a value which is less than "1" when the torque difference (DTRQ) is greater than a predetermined upper limit value (DTRQLL), and also when the torque difference (DTRQ) is less than a predetermined lower limit value (DTRQLL).

With this configuration, when the torque difference is greater than the predetermined upper limit value, and also when the torque difference is less than the predetermined lower limit value, the correction coefficient is set to a value which is less than "1". Accordingly, when the torque difference exceeds the predetermined upper limit value, it is possible to suppress disadvantage that the time period for the abnormality determination becomes too short. When the torque difference is less than the predetermined lower limit value, it is possible to suppress deterioration of the determination accuracy by making the time period for the abnormality determination longer.

Preferably, the abnormality determining means includes determination time period setting means for setting a determination time period (TDET) according to the torque difference (DTRQ); and second determining means for determining that an abnormality has occurred in the output torque control means when a state where the torque difference (DTRQ) is greater than a predetermined difference value (DTMGN2) continues for a time period which is equal to or longer than the determination time period (TDET), wherein the abnormality determining means fixes the abnormality determination when both of the first and second determining means make the determination that the abnormality has occurred.

With this configuration, the determination time period is set according to the torque difference and it is determined by the second determining means that an abnormality has occurred in the output torque control means when the state where the torque difference is greater than the predetermined difference value continues for the time period which is equal to or longer than the determination time period. The abnormality determination is fixed when both of the first and second determining means make the determination that the abnormality has occurred. The second determining means performs the determination with a method obtained by improving the method shown in Patent Document 1. By setting the determination time period according to the torque difference, it is possible to improve the balance between the determination accuracy and the time period necessary for the determination, compared with the method shown in Patent Document 1. Further, by fixing the abnormality determination when both of the first and second determining means determine that the abnormality has occurred, it is possible to enhance reliability of the final determination result.

Preferably, the second determining means uses the minimum value of the determination time period (TDTMP(j)) for the determination when the determination time period (TDTMP(j)) changes corresponding to a change in the torque difference (DTRQ).

With this configuration, when the determination time period changes corresponding to a change in the torque difference, the minimum value of the determination time period is used for the determination. Accordingly, it is possible for the second determining means to perform the determination with emphasis on rapidness when the torque difference changes.

Preferably, the output torque control means includes an actuator (11,12,13) for changing the output torque of the prime mover; detecting means for detecting operation parameters (TH, AP) indicative of an operating condition of the actuator and an acceleration intention of the driver of the vehicle; and control calculation means (100) for outputting an actuation signal according to the operation parameters detected by the detecting means, the actuation signal actuating the actuator, wherein the abnormality determining means determines an abnormality in the calculation performed by the control calculation means (100), and relevant device abnormality determining means is provided separately from the abnormality determining means, the relevant device abnormality determining means determining an abnormality except the abnormality in the calculation performed by the control calculation means (100).

With this configuration, an abnormality except the abnormality in the calculation performed by the control calculation means is determined by the relevant device abnormality determining means. Accordingly, the abnormality determining means can determine the abnormality occurred in the calculation performed by the control calculation means.

Preferably, the drive control apparatus further includes allowable torque calculating means for calculating an allowable torque (TRQLMH) according to an operating condition of the prime mover; and third determining means for determining that there exists a possibility that an abnormality has occurred in the output torque control means, when the estimated output torque (TRQE) exceeds the allowable torque (TRQLMH), wherein when the third determining means determines that there exists the possibility that an abnormality has occurred in the output torque control means, the determination by the first determining means or the determination by the first and second determining means is performed.

With this configuration, the allowable torque is calculated according to an operating condition of the prime mover, it is determined that there exists a possibility that an abnormality has occurred in the output torque control means, when the estimated output torque exceeds the allowable torque, and the determination by the first determining means or the determination by the first and second determining means is performed. Accordingly, the abnormality determination is doubled or triplicated, which makes it possible to enhance accuracy of the abnormality determination.

Preferably, the allowable torque setting means sets the allowable torque (TRQLMH) to a decelerating condition predetermined amount (DTC2), when an acceleration operation amount (AP) indicative of the acceleration intention of the driver of the prime mover is in the vicinity of "0".

With this configuration, when the acceleration operation amount indicative of the acceleration intention of the driver of the prime mover is in the vicinity of "0", the allowable torque is set to the decelerating condition predetermined amount. When the acceleration operation amount is in the vicinity of "0", the operating condition of the prime mover is comparatively stable, and the target torque takes a negative value near "0". Accordingly, by setting the allowable torque, which corresponds to a margin for preventing erroneous determination, to the decelerating condition predetermined amount having a comparatively small value, it is possible to perform the abnormality determination with high accuracy.

Preferably, the allowable torque calculating means calculates the allowable torque (TRQLMH) by adding an accelerating condition predetermined amount (DTC1) to the target torque (TRQCMD), when the acceleration operation amount (AP) is equal to or greater than a first operation amount threshold value (APL) which is greater than "0", the accelerating condition predetermined amount (DTC1) being greater than the decelerating condition predetermined amount (DTC2).

With this configuration, when the acceleration operation amount is equal to or greater than the first operation amount threshold value which is greater than "0", the allowable torque is calculated by adding the accelerating condition predetermined amount to the target torque. When the driver has the acceleration intention, stability of the prime mover operating condition becomes lower compared with the condition where the value of the accelerating operation amount is in the vicinity of "0". Accordingly, calculating the allowable torque by adding the accelerating condition predetermined amount to the target torque can prevents erroneous determination.

Preferably, when the acceleration operation amount (AP) is equal to or greater than the first operation amount threshold value (APL) and less than a second operation amount threshold value (APM) which is greater than the first operation amount threshold value, and the target torque (TRQCMD) is greater than a predetermined torque threshold value (TRQR2), the allowable torque calculating means sets the allowable torque (TRQLMH) to the predetermined torque threshold value (TRQR2), and the predetermined torque threshold value (TRQR2) is set to a value which is greater than an average value of the target torque corresponding to the second operation amount threshold value (APM).

With this configuration, when the acceleration operation amount is equal to or greater than the first operation amount threshold value and less than the second operation amount threshold value, and the target torque is greater than the predetermined torque threshold value, the allowable torque is set to the predetermined torque threshold value, and the predetermined torque threshold value is set to the value which is greater than the average value of the target torque corresponding to the second operation amount threshold value. Accordingly, if the target torque exceeds the predetermined torque threshold value, by determining that there is high possibility that an abnormality exists in calculation of the target torque and setting the allowable torque to the predetermined torque threshold value, it is possible to avoid erroneous determination caused by setting the allowable torque according to the target torque.

Preferably, the drive control apparatus further includes acceleration detecting means for detecting a rotational acceleration (DNE) of the prime mover, wherein when the rotational acceleration (DNE) exceeds a predetermined acceleration threshold value (DNETH), the determination by the first and third determining means or the determination by the first, second, and third determining means is inhibited.

With this configuration, the rotational acceleration of the prime mover is detected, and when the rotational acceleration exceeds the predetermined acceleration threshold value, the determination by the first and third determining means or the determination by the first, second, and third determining means is inhibited. When the rotational acceleration exceeds the predetermined acceleration threshold value, for example, when the prime mover is an internal combustion engine and the engine is being started, or racing of the engine is performed, erroneous determination is avoidable by inhibiting the determination.

BRIEF DESCRIPTION OF THE DRAWINGS

FIG. 1 shows a configuration of a vehicle drive apparatus according to one embodiment of the present invention;

FIG. 2 shows a relationship between a torque difference (a difference between a target torque and an estimated torque: DTRQ) and a determination time period (TDET);

FIG. 3 is a graph for explaining a process for calculating an accumulated value (SUMP) by accumulating a product of the torque difference (DTRQ) and a calculation period (DT);

FIG. 4 is a graph for explaining a method of an abnormality determination (second determination);

FIG. 5 is a flowchart of an abnormality determination process;

FIG. 6 is a flowchart of a first determination process executed in the process of FIG. 5;

FIG. 7 is a flowchart of a second determination process executed in the process of FIG. 5;

FIG. 8 shows graphs for explaining a correction of the torque difference (DTRQ);

FIG. 9 is a flowchart of the first determination process (second embodiment);

FIG. 10 is a flowchart showing a total configuration of the abnormality determination process for the torque control system (third embodiment);

FIG. 11 is a flowchart of the abnormality determination process (fourth embodiment);

FIG. 12 is a flowchart of an allowable torque calculation process executed in the process of FIG. 11;

FIG. 13 a block diagram illustrating a function of an electronic control unit for engine control by dividing the function into three blocks; and FIG. 14 shows a vehicle drive apparatus including an internal combustion engine and a motor as prime movers.

MODE FOR CARRYING OUT THE INVENTION

Preferred embodiments of the present invention will now be described with reference to the drawings.

First Embodiment

FIG. 1 shows a vehicle drive apparatus according to one embodiment of the present invention. This vehicle drive apparatus includes an internal combustion engine (hereinafter referred to as "engine") 1 and a transmission 2. The engine 1 is a prime mover for driving the vehicle, and the transmission 2 transmits an output torque of the engine 1. The vehicle drive apparatus is configured so as to drive driving wheels 6 via an output shaft 3 of the transmission 2, a differential gear mechanism 4, and a drive shaft 5.

The engine 1 has a throttle valve disposed in an intake passage, and an actuator 11 for changing an opening of the throttle valve is connected to an electronic control unit (hereinafter referred to as "ECU") 100. The engine 1 has fuel injection valves 12 for injecting fuel into the intake passage and spark plugs 13. Operations of the actuator 11, the fuel injection valves 12, and the spark plugs 13 are controlled by the ECU 100.

An engine rotational speed sensor 101 for detecting an engine rotational speed NE, an accelerator pedal sensor 102 for detecting an operation amount AP of an accelerator pedal of the vehicle (hereinafter referred to as "accelerator pedal operation amount AP"), a throttle valve opening sensor 103 for detecting an opening TH of the throttle valve, an intake air flow rate sensor 104 for detecting an intake air flow rate GAIR of the engine 1, and various sensors not shown are connected to the ECU 100, and the detection signals of these sensors are supplied to the ECU 100. As the sensors not shown, for example, a coolant temperature sensor for detecting an engine coolant temperature TW, an intake air temperature sensor for detecting an intake air temperature TA, an intake pressure sensor for detecting an intake pressure, an air-fuel ratio sensor for detecting an air-fuel ratio AF and the like are connected to the ECU 100. Further, an electronic control unit for controlling the transmission 2, an electronic control unit for performing a control for stabilizing the vehicle running, and the like, which are not shown, are connected to the ECU 100 via a LAN (Local Area Network). These electronic control units connected to the ECU 100 are hereinafter referred to as "external ECU".

The ECU 100 calculates a target torque TRQCMD of the engine 1 mainly according to the accelerator pedal operation amount AP, controls the throttle valve opening TH and an ignition timing IGLOG so that the output torque of the engine 1 coincides with the target torque TRQCMD, and controls a fuel injection period by the fuel injection valve 12 according to the intake air flow rate GAIR and a target air-fuel ratio. The control of the throttle valve opening TH is performed by actuating the actuator 11 so that the throttle valve opening TH detected by the throttle valve opening sensor 103 coincides with the target opening THCMD, and the target opening THCMD is calculated according to the target torque TRQCMD. It is to be noted that the demands from the above-described external ECUs are also reflected to the calculation of the target torque TRQCMD.

Further, in this embodiment, the ECU 100 calculates an estimated output torque TRQE which is an estimated value of the output torque of the engine 1 according to the intake air flow rate GAIR, the ignition timing IGLOG, and the air-fuel ratio AF, and performs abnormality determination in the engine torque control based on a torque difference DTRQ (=TRQE−TRQCMD) between the estimated output torque TRQE and the target torque TRQCMD.

An outline of the torque control abnormality determination in this embodiment is explained with reference to FIGS. 2-4. This torque control abnormality determination consists of a first determination and a second determination, and both of determination results of the first determination and the second determination indicate that an abnormality has occurred, the abnormality occurrence determination that an abnormality has occurred in the torque control, is fixed.

In order to solve the above-described problem of the prior art, the first determination of this embodiment is performed as follows: if the torque difference DTRQ is comparatively small, the abnormality determination is performed for a comparatively long determination time period TDET, and the determination time period TDET is made shorter as the torque difference DTRQ increases, thereby preventing reduction in determination accuracy when the torque difference is small and enabling rapid determination when the torque difference is large. Specifically, the abnormality determination is performed so that the torque difference DTRQ and the determination time period TDET satisfy the relationship indicated by the curve L1 of FIG. 2, and the hyperbolic curve is used as the curve L1 on which the product of the torque difference DTEQ and the determination time period TDET takes a constant value PTH.

It is to be noted that DTMGN1 shown in FIG. 2 is a first allowable torque difference which is used in the first determination. If the time period in which the torque difference DTRQ exceeds the first allowable torque difference DTMGN1 has continued for a time period longer than the determination time period TDET, it is determined that an abnormality has occurred. The state where the torque difference DTRQ is equal to or less than the first allowable torque difference DTMGN1 is determined to be a normal state.

If the torque difference DTRQ is constant from the time tEX the torque difference DTRQ exceeds the first allowable torque difference DTMGN, the abnormality determination which satisfies the relationship of the curve L1 shown in FIG. 2 can be performed by calculating the determination time period TDET, which satisfies the relationship of the curve L1, according to the torque difference DTRQ at the time tEX, and by determining that an abnormality has occurred, at the time the determination time period TDET has elapsed from the time tEX.

However, the torque difference DTRQ normally changes. Accordingly, in the first determination, the method in which an accumulated value SUMP is calculated and it is determined that an abnormality has occurred when the accumulated value SUMP exceeds the constant value PTH, is employed. The accumulated value SUMP, which approximates a time-integration value of the torque difference DTRQ (an area value of the region surrounded, as shown in FIG. 3, by the curve indicative of changes in DTRQ and the time axis), is calculated by accumulating the product P of the torque difference DTRQ and a calculation period DT (e.g., 20 msec).

In other words, it is determined that an abnormality has occurred when the accumulated value SUMP corresponding to a sum of areas of the rectangular regions indicated by the broken lines in FIG. 3 exceeds the constant value PTH which corresponds to an area of the rectangular region R1 indicated by the broken line in FIG. 2.

According to the above-described method, in the actual operating condition where the torque difference changes, it is possible to satisfy the demand that the abnormality determination should be performed for a comparatively long determination time period TDET when the torque difference is comparatively small, and the determination time period TDET should be made shorter as the torque difference DTRQ increases. That is, the above-described method makes it possible to improve the balance between the time period required for the determination and the determination accuracy, regardless of changes in the torque difference DTRQ. In addition, by employing the hyperbolic curve as the curve L1, it is possible to perform the determination by comparing the accumulated value SUMP with the constant value PTH, which consequently simplifies the determination process, compared with the method of setting the determination time period TDET according to the torque difference DTRQ.

The torque difference DTRQ indicates an excessively-generated torque which exceeds the target torque TRQCMD, and the engine output torque is proportional to the driving force FD generated by the engine. Accordingly, the product P of the torque difference DTRQ and the calculation period DT is a parameter proportional to the impulse, i.e., a product of the excessive driving force FDEX corresponding to the torque difference DTRQ and the time period DT during which the excessive driving force FDEX is applied. Therefore, the fact that the accumulated value SUMP exceeds the constant value PTH is equivalent to the fact that an increase amount of the vehicle momentum caused by the excessive drive force FDEX exceeds a threshold momentum.

The accumulated value SUMP is given by the following equation (1). However, in the abnormality determination process described below, an accumulated value SUMDTRQ is calculated by the following equation (2), without calculating the product P of the torque difference DTRQ and the calculation period DT, the accumulated value SUMDTRQ corresponding to an accumulated value of the torque difference DTRQ itself calculated at intervals of the calculation period DT, since the calculation period DT is constant. It is determined that an abnormality has occurred if the accumulated value SUMDTRQ exceeds a determination threshold value SUMDTH (=PTH/DT). In the equations (1) and (2), "i" indicates a discrete time digitized with the calculation period DT.

$$SUMP = \Sigma DTRQ(i) \times DT \quad (1)$$

$$SUMDTRQ = SUMP/DT = \Sigma DTRQ(i) \quad (2)$$

Next, a method of the second determination is described with reference to FIG. 4. FIG. 4 shows a relationship between the torque difference DTRQ and the determination time period TDET, the relationship being used in the second determination. The relationship of FIG. 4 is set similarly to FIG. 2 so that the determination time period TDET becomes shorter as the torque difference DTRQ increases. DTMGN2 shown in FIG. 4 is a second allowable torque difference used in the second determination.

In the second determination, when the torque difference DTRQ exceeds the second allowable torque difference DTMGN2, a temporary determination time period TDTMP (j) is calculated according to the torque difference DTRQ using the relationship (table) shown in FIG. 4, and the determination is performed using the minimum value MIN (TDTMP(i)) of the temporary determination time period TDTMP(j) calculated at intervals of the calculation period. In other words, it is determined that an abnormality has occurred, if the state where the torque difference DTRQ exceeds the second allowable torque difference DTMGN2 continues for a time period greater than the minimum value MIN(TDTMP(i)).

FIG. 5 is a flowchart of the abnormality determination process. This process is executed at intervals of the calculation period DT in the CPU (central operation unit) of the ECU 100.

In step S11, the estimated output torque TRQE is calculated using a known method according to the intake air flow rate GAIR, the ignition timing IGLOG, and the air-fuel ratio AF. In step S12, the torque difference DTRQ is calculated by subtracting the target torque TRQCMD from the estimated output torque TRQE.

In step S13, the first determination process shown in FIG. 6 is executed. If it is determined that an abnormality has occurred in the first determination process, a first abnormality determination flag FFAIL1 is set to "1". In step S14, the second determination process shown in FIG. 7 is executed. If it is determined that an abnormality has occurred in the second determination process, a second abnormality determination flag FFAIL2 is set to "1".

In step S15, it is determined whether or not the first abnormality determination flag FFAIL1 is "1". If the answer to step S15 is affirmative (YES), it is determined whether or not the second abnormality determination flag FFAIL2 is "1" (step S16). If the answer to step S15 or S16 is negative (NO), the process immediately ends. If the answer to step S16 is affirmative (YES), the determination that an abnormality has occurred in the torque control system is fixed (step S17).

The torque control system consists of the ECU 100 and relevant devices, such as the accelerator pedal sensor 102, the throttle valve opening sensor 103, the intake air flow rate sensor 104, the actuator 11, the fuel injection valves 12, and the spark plugs 13.

FIG. 6 is a flowchart of the first determination process executed in step S13 of FIG. 5.

In step S21, it is determined whether or not the torque difference DTRQ is greater than the first allowable torque difference DTMGN1. If the answer to step S21 is negative (NO), the accumulated value SUMDTRQ is set to "0" (step S22), and the first abnormality determination flag FFAIL1 is set to "0" (step S26). Thereafter, the process ends.

If the answer to step S21 is affirmative (YES), the accumulated value SUMDTRQ is calculated by the following equation (3) (step S23). SUMDTRQ on the right side is a preceding calculated value.

$$SUMDTRQ = SUMDTRQ + DTRQ \quad (3)$$

In step S24, it is determined whether or not the accumulated value SUMDTRQ is greater than the determination threshold value SUMDTTH. If the answer to step S24 is negative (NO), the process proceeds to step S26. When the answer to step S24 becomes affirmative (YES), the process proceeds to step S25, in which the first abnormality determination flag FFAIL1 is set to "1".

FIG. 7 is a flowchart of the second determination process executed in step S14 of FIG. 5.

In step S31, it is determined whether or not the torque difference DTRQ is greater than the second allowable torque difference DTMGN2. If the answer to step S31 is negative (NO), both of a value of a timer TM and an index parameter j are set to "0" (step S32), and the second abnormality determination flag FFAIL2 is set to "0" (step S38). Thereafter the process ends. The timer TM is a timer for measuring a time period during which the torque difference DTRQ exceeds the second allowable torque difference DTMGN2, and the index parameter j indicates a discrete time obtained by digitizing the value of the timer TM with the calculation period DT.

If the answer to step S31 is affirmative (YES), the temporary determination time period TDTMP(j) is calculated using the torque difference DTRQ and the relationship shown in FIG. 4 (step S33). In step S34, the determination time period TDET is set to the minimum value of values of the temporary determination time period TDTMP(j) calculated up to the present time. In step S35, the value of the timer TM is increased by the calculation period DT, and the index parameter j is increased by "1".

In step S36, it is determined whether or not the value of the timer TM is equal to or greater than the determination time period TDET. If the answer to step S36 is negative (NO), the process proceeds to step S38. When the answer to step S36 becomes affirmative (YES), the process proceeds to step S37, in which the second abnormality determination flag FFAIL2 is set to "1".

As described above, in this embodiment, the target torque TRQCMD of the engine 1 for driving the vehicle is calculated, and the output torque control is performed so that the output torque of the engine 1 coincides with the target torque TRQCMD. The estimated output torque TRQE is calculated according to parameters including the intake air flow rate GAIR, the accumulated value SUMDTRQ which approximates a time-integration value of the torque difference DTRQ between the target torque TRQCMD and the estimated output torque TRQE, is calculated, and it is determined in the first determination process (FIG. 6) that an abnormality has occurred in the torque control system when the accumulated value SUMDTRQ exceeds the determination threshold value SUMDTH which is set to a constant value. The accumulated value SUMDTRQ is a parameter which is substantially proportional to a product (an impulse=a change amount of the momentum) of the excessive drive force FDEX and a time period during which the excessive drive force FDEX acts on the vehicle, the excessive drive force FDEX corresponding to a part of the drive force generated by the engine 1 which exceeds the target value. That is, the accumulated value SUMDTRQ reaches the determination threshold value SUMDTH in a less time period as the excessive drive force FDEX (the torque difference DTRQ) becomes larger. Accordingly, the abnormality determination can be performed promptly in a state where the excessive drive force FDEX is large. On the other hand, in a state where the excessive drive force FDEX is comparatively small, high determination accuracy can be obtained by making a determination of abnormality occurrence after a long monitoring period. Further, when the excessive drive force FDEX changes after the excessive drive force FDEX is generated, the change is reflected to the accumulated value SUMDTRQ. Accordingly, even when the excessive drive force FDEX changes in the monitoring period (the period from the time the excessive drive force FDEX is generated to the time the determination of abnormality occurrence is made), it is possible to appropriately perform the determination corresponding to the change in the excessive drive force FDEX.

Further, in the second determination process (FIG. 7), the determination time period TDET is set according to the torque difference DTRQ and it is determined that an abnormality has occurred in the torque control system when the state where the torque difference DTRQ is greater than the second allowable difference DTMDN2 continues for the time period which is equal to or longer than the determination time period TDET. The abnormality determination is fixed when the determination that the abnormality has occurred is made in both of the first and second determination processes. In the second determination process, the determination is performed with a method obtained by improving the method shown in Patent Document 1. By setting the determination time period TDET according to the torque difference DTRQ, it is possible to improve the balance between the determination accuracy and the time period necessary for the determination, compared with the method shown in Patent Document 1. Further, by fixing the abnormality determination when the determination that the abnormality has occurred is made in both of the first and second determination processes, it is possible to enhance reliability of the final determination result.

Further, in the second determination process, the temporary determination time period TDTMP(j) is calculated according to the torque difference DTRQ, and the determination time period TDET is set to the minimum value of the temporary determination time period TDTMP(j). Accordingly, it is possible to perform the determination with emphasis on rapidness when the torque difference DTRQ changes.

In this embodiment, the output torque control means consists of the ECU 100 and the relevant devices such as the accelerator pedal sensor 102, the throttle valve opening sensor 103, the intake air flow rate sensor 104, the actuator 11, the fuel injection valves 12, and the spark plugs 13. Further, the ECU 100 constitutes the abnormality determining means, the estimated output torque calculating means, the torque difference accumulated value calculating means, the first determining means, the determination time period calculating means, and the second determining means. Specifically, step S11 of FIG. 5 corresponds to the estimated output torque calculating means, step S12 of FIG. 5 and step S23 of FIG. 6 correspond to the torque difference accumulated value calculating means, steps S24 and S25 of FIG. 6 correspond to the first determining means, step S33 of FIG. 7 corresponds to the determination time period calculating means, and steps S34-S37 correspond to the second determining means.

Second Embodiment

In this embodiment, a correction coefficient KCR is multiplied with the torque difference DTRQ to calculate a corrected torque difference DTRQC, and the accumulated value SUMDTRQ is calculated by accumulating the corrected torque difference DTRQC. This embodiment is the same as the first embodiment except for the points described below.

FIG. 8(a) shows a graph for explaining a correction of the torque difference DTRQ in this embodiment. In FIG. 8(a), the curve L1 is shown similarly to FIG. 2, and, in addition, a broken line L2 for illustrating an upper limit correction, a broken line L3 for illustrating a lower limit correction, and broken lines L4 and L5 for illustrating a correction (hereinafter referred to as "transmission mechanism correction") depending on an efficiency of the torque transmission mechanism, etc. are shown.

The upper limit correction is performed in consideration of the maximum output torque of the engine 1, for suppressing disadvantage that when the torque difference becomes very large, the determination time period TDET may become too short if the relationship of the curve L1 is applied without any correction. The correction indicated by the broken line L2 is performed when the torque difference DTRQ exceeds an upper limit value DTRQHL, and this correction is implemented by setting the correction coefficient KCR, which is multiplied with the torque difference DTRQ, to a value less than "1.0".

The lower limit correction is performed in consideration of calculation error of the estimated output torque TRQE, for suppressing disadvantage that the determination accuracy may be reduced if the relationship of the curve L1 is applied without any correction. In the lower limit correction, the determination time period TDET is corrected to substantially become longer. The correction indicated by the broken line L3 is performed when the torque difference becomes lower than a lower limit value DTRQLL, and this correction is implemented by setting the correction coefficient KCR to a value less than "1.0".

The transmission mechanism correction is performed in consideration of a characteristic of the torque transmission mechanism from the engine 1 to the drive wheels 6. For example, a change in the torque transmission efficiency corresponding to a change in the engine output torque is considered. The broken line L4 indicates an example of the correction in which the determination time period TDET is made longer, which is implemented by setting the correction coefficient KCR to a value less than "1.0". The transmission mechanism correction is not limited to the broken line L4, and the correction shown by the broken line L5 may be performed depending on the characteristic of the torque transmission mechanism. The correction shown by the broken line L5 is implemented by setting the correction coefficient KCR to a value greater than "1.0".

FIG. 8(b) shows an example of the setting characteristic of the correction coefficient KCR according to the torque difference DTRQ. When the correction coefficient KCR is equal to "1.0", the relationship between the torque difference DTRQ and the determination time period TDET coincides with the curve L1. If the correction coefficient KCR is set to a value less than "1.0", the relationship between the torque difference DTRQ and the determination time period TDET may be indicated by the broken line L2, L3, or L4, and may be indicated by the broken line L5 if the correction coefficient KCR is set to a value greater than "1.0".

FIG. 9 is a flowchart of the first determination process in this embodiment. Steps S41, S42, and S46-S48 of FIG. 9 are respectively the same as steps S21, S22, and S24-S26 of FIG. 6 in the first embodiment.

In step S43, the correction coefficient KCR is calculated by retrieving a KCR table which is, for example, set as shown in FIG. 8(b), according to the torque difference DTRQ. In step S44, the corrected torque difference DTRQC is calculated by the following equation (4).

$$DTRQC = DTRQ \times KCR \qquad (4)$$

In step S45, the accumulated value SUMDTRQ is calculated by accumulating the corrected torque difference DTRQC.

In this embodiment, the correction coefficient KCR relative to the characteristic of the torque transmission mechanism which transmits the output torque of the engine 1 to the driving wheels 6, is calculated according to the torque difference DTRQ, and the corrected torque difference DTRQC is calculated by multiplying the correction coefficient KCR with the torque difference DTRQ, and the accumulated value SUMDTRQ is calculated by accumulating the corrected torque difference DTRQC. By applying the correction coefficient KCR relative to the characteristic of the torque transmission mechanism, the accumulated value SUMDTRQ to which the characteristic of the torque transmission mechanism is reflected, is obtained. Accordingly, it is possible, for example, to perform a correction that contribution of the torque difference DTRQ to the accumulated value SUMDTRQ is decreased as the torque difference DTRQ decreases, which makes it possible to appropriately set the balance between the time period necessary to perform the abnormality determination and the determination accuracy, corresponding to the characteristic of the torque transmission mechanism.

Further, when the torque difference DTRQ is greater than the predetermined upper limit value DTRQHL, and when the torque difference DTRQ is less than the predetermined lower limit value DTRQLL, the correction coefficient KCR is set to a value which is less than "1". Accordingly, when the torque difference DTRQ exceeds the predetermined upper limit value DTRQHL, it is possible to suppress disadvantage that the time period for the abnormality determination becomes too short. When the torque difference DTRQ is less than the predetermined lower limit value DTRQLL, it is possible to suppress deterioration of the determination accuracy by making the time period for the abnormality determination longer.

In this embodiment, step S43 of FIG. 9 corresponds to the correction coefficient calculating means, step S44 corresponds to the correcting means, and steps S45-S47 correspond to the first determining means.

Third Embodiment

In this embodiment, a failure determination process is performed before executing the abnormality determination process (FIG. 5) of the first embodiment, thereby executing the abnormality determination process of FIG. 5 in the state where no failure of the relevant devices for performing the torque control (the accelerator pedal sensor 102, the throttle valve opening sensor 103, the actuator 11, and the like) has occurred. This embodiment is the same as the first embodiment except for the points described below.

FIG. 10 is a flowchart showing a total configuration of the torque control system abnormality determination process in this embodiment. This process is executed at intervals of the calculation period DT by the CPU in the ECU 100.

In step S51, a failure determination process of the relevant devices is executed to set the flags referred to in steps S52, S54, S56, and S58.

In step S52, it is determined whether or not an accelerator pedal sensor failure flag FAPSNSF is "1". If the answer to step S52 is affirmative (YES), it is determined that an abnormality has occurred in the accelerator pedal sensor 102 (step S53), and the process ends.

Similarly, it is determined whether or not a throttle valve opening sensor failure flag FTHSNSF is "1", and whether or not a throttle actuator failure flag FTHACTF is "1" (steps S54 and S56). If one of the answers to steps S54 and S56 is affirmative (YES), and it is determined that the throttle valve opening sensor 103 is abnormal or the actuator 11 is abnormal (step S55, S57), and the process ends.

Further, it is determined whether or not a relevant device failure flag FRDVSF is "1" (step S58), the relevant device failure flag FRDVSF indicating that a failure of the relevant device (for example, the intake air flow rate sensor 104, the fuel injection valve 12, or the like) other than the above-described relevant devices is detected. If the answer to step S58 is affirmative (YES), the relevant device is determined to be abnormal (step S59), and the process ends.

If the answer to step S59 is negative (NO), the process proceeds to the abnormality determination process shown in FIG. 5.

In this embodiment, the failure determination of the relevant devices other than the ECU 100 is performed in advance, and the abnormality determination process of FIG. 5 is executed in the state where no failure of the relevant devices is detected. Accordingly, the abnormality determination process of FIG. 5 can determine an abnormality occurred in the calculation performed by the ECU 100.

In this embodiment, the actuator 11, the fuel injection valves 12, and the spark plugs 13 correspond to the actuator, the accelerator pedal sensor 102, the throttle valve opening sensor 103, the intake air flow rate sensor 104, the air-fuel ratio sensor, and the like correspond to the detecting means, and the ECU 100 constitutes the control calculation means and the relevant device abnormality determining means. Specifically, steps S51-S59 of FIG. 10 correspond to the relevant device abnormality determining means.

Fourth Embodiment

In this embodiment, some steps are added to the abnormality determination process (FIG. 5) of the first embodiment, thereby multiplexing the abnormality determination process to enhance determination accuracy. This embodiment is the same as the first embodiment except for the points described below.

FIG. 11 is a flowchart of the abnormality determination process in this embodiment. This process corresponds to a process in which steps S40-S44 are added to the process shown in FIG. 5.

In step S40, a rotational speed change amount DNE corresponding to a rotational acceleration of the engine 1 is calculated by the following equation (5). In the equation (5), k is a discrete time digitized with a sampling period (e.g., 100 msec) of the engine rotational speed NE.

$$DNE=NE(k)-NE(k-1) \qquad (5)$$

In step S41, it is determined whether or not the rotational speed change amount DNE is equal to or lower than a predetermined threshold value DNETH. The predetermined threshold value DNETH is set, for example, to about 500 rpm/100 msec. At the time of starting the engine 1 or when racing of the engine 1 is performed by the driver, the rotational speed change amount DNE may sometimes exceed the predetermined threshold value DNETH, and, in such case, the abnormality determination cannot be performed accurately. Accordingly, if the answer to step S41 is negative (NO), the process immediately ends.

If the answer to step S41 is affirmative (YES), the estimated output torque TRQE is calculated (step S11). In step S42, the allowable torque calculation process shown in FIG. 12 is executed to calculate the allowable torque TRQLMH corresponding to the upper limit value of the engine output torque, according to the engine operating condition.

In step S43, it is determined whether or not the estimated output torque TRQE is greater than the allowable torque TRQLMH. If the answer to step S43 is negative (NO), i.e., if the estimated output torque TRQE is equal to or less than the allowable torque TRQLMH, the torque control system is determined to be normal (step S44). On the other hand, if the answer to step S43 is affirmative (YES), it is determined that there exists possibility that an abnormality has occurred in the torque control system, and the process of step S12 and the following steps are executed, i.e., the first and second determination process described above are performed.

FIG. 12 is a flowchart of the allowable torque calculation process executed in step S42 of FIG. 11.

In step S51, it is determined whether or not an external demand flag FEXTD is "1". The external demand flag FEXTD is set to "1", when a demand for the output torque is input from any one of external ECUs (a transmission control ECU, a vehicle running stabilizing control ECU, and the like). If the answer to step S51 is affirmative (YES), i.e., the external demand is input, a basic allowable torque TRQLMB is set to the target torque TRQCMD (step S52), a correction amount DTCR is set to a third predetermined amount DTC3 (step S53), and the allowable torque TRQLMH is calculated by the following equation (6) (step S63). The third predetermined amount DTC3 is set, for example, to a value of about 15-20% of the maximum torque TRQMAX.

$$TRQLMH=TRQLMB+DTCR \qquad (6)$$

If the answer to step S51 is negative (NO), it is determined whether or not the accelerator pedal operation amount AP is less than a first operation amount threshold value APL (set to, e.g., a value of about 3% of the maximum operation amount) (step S54). If the answer to step S54 is affirmative (YES), i.e., the accelerator pedal operation amount AP is substantially equal to "0", the basic allowable torque TRQLMB is set to a first predetermined torque TRQR1 (step S55), the correction amount DTCR is set to a second predetermined amount DTC2 (step S56), and the process proceeds to step S63.

When the accelerator pedal operation amount AP is substantially equal to "0", the target torque TRQCMD is assumed to be set to a negative value. Accordingly, the first predetermined torque TRQR1 is set, for example, to a value in the vicinity of "0". The second predetermined amount DTC2 is set to a value of about 10% of the maximum torque TRQMAX. The second predetermined amount DTC2 corresponding to a margin for preventing erroneous determination is set to a comparatively small value, since the operating condition where the accelerator pedal operation amount AP is substantially equal to "0", is considered to be a comparatively stable condition.

If the answer to step S54 is negative (NO), i.e., the accelerator pedal operation amount AP is equal to or greater than the first operation amount threshold value APL, it is determined whether or not the accelerator pedal operation amount AP is less than a second operation amount threshold value APM (e.g., set to a value of about 30% of the maximum operation amount) (step S57). If the answer to step S57 is affirmative (YES), it is determined whether or not the target torque TRQCMD is greater than a second predetermined torque TRQR2 (step S58). The second predetermined torque TRQR2 is set, for example, to a value of about 70% of the maximum torque TRQMAX. Since the second operation amount threshold value APM is set to a value of about 30% of the maximum operation amount, the second predetermined torque TRQR2 is set to a value which is greater than an average value of the target torque TRQCMD corresponding to the second operation amount threshold value APM.

If the answer to step S58 is affirmative (YES), it is considered that the target torque TRQCMD is set to an abnormally large value. In such case, the basic allowable torque TRQLMB is set to the second predetermined torque TRQR2 (step S59), and the correction amount DTCR is set to a fourth predetermined amount DTC4 (step S60). The process thereafter proceeds to step S63. Since the second predetermined torque TRQR2 is set to a comparatively large value, the fourth predetermined amount DTC4 is set to a small value in the vicinity of "0". By setting the basic allowable torque TRQLMB to a value substantially equal to the second predetermined torque TRQR2, it is possible to prevent erroneous determination due to setting the basic allowable torque TRQLMB to the target torque TRQCMD of an abnormally large value.

If the answer to step S57 is negative (NO), i.e., if the accelerator pedal operation amount AP is equal to or greater than the second operation amount threshold value APM, or if the answer to step S58 is negative (NO), i.e., if the target torque TRQCMD is equal to or less than the second predetermined torque TRQR2, the process proceeds to step S61, in which the basic allowable torque TRQLMB is set to the target torque TRQCMD. Next, the correction amount DTCR is set to the first predetermined amount DTC1 (step S62), and the process proceeds to step S63. The first predetermined amount DTC1 is set to a value of about 15-20% of the maximum torque TRQMAX, which is nearly equal to the third predetermined amount DTC3. When the accelerator pedal is operated, stability of the engine operating condition is reduced compared with the state where the accelerator pedal operation amount AP is in the vicinity of "0". Accordingly, the first predetermined amount DTC1 is set to a value greater than the second predetermined amount DTC2.

FIG. 13 is a diagram showing functions implemented by the ECU 100, which are divided as an input block 111, a target torque calculation block 112, and an engine control block 113. The target torque calculation block 112 calculates the target torque TRQCMD according to the input operating parameters and the demands from the external ECUs. The engine control block 113 performs the intake air flow rate control, the fuel injection amount control, and the ignition timing control for realizing the target torque TRQCMD as the actual output torque.

In the operating condition where the accelerator pedal operation amount AP is less than the first operation amount threshold value API, the abnormality which is determined in FIG. 12 using the calculated allowable torque TRQLMH (=TRQR1+DTC2) is considered to be an abnormality in any one of the input block 111, the target torque calculation block 112, and the engine control block 113. Further, in the operating condition where the accelerator pedal operation amount AP is equal to or greater than the second operation amount threshold value APM, or in the operating condition where the accelerator pedal operation amount AP is equal to or greater than the first operation amount threshold value APL and less than the second operation amount threshold value APM, and the target torque TRQCMD is equal to or less than the second predetermined torque TRQR2, the abnormality which is determined using the calculated allowable torque TRQLMH (=TRQCMD+DTC1) is considered to be an abnormality in the engine control block 113. Further, in the operating condition where the accelerator pedal operation amount AP is less than the second operation amount threshold value APM, and the target torque TRQCMD is greater than the second predetermined torque TRQR2, the abnormality which is determined using the calculated allowable torque TRQLMH (=TRQR2+DTC4) is considered to be an abnormality in the target torque calculation block 112. Further, when there exists a demand from the external ECU, the abnormality which is determined using the calculated allowable torque TRQLMH (=TRQCMD+DTC3) is considered to be an abnormality in the engine control block 113.

As described above, in this embodiment, the allowable torque TRQLMH is calculated according to the operating condition of the engine 1, and when the estimated output torque TRQE exceeds the allowable torque TRQLMH it is determined that there exists a possibility that an abnormality has occurred in the torque control system. Then, the determination by the first and second determination processes is performed. Accordingly, the abnormality determination is triplicated, which makes it possible to enhance accuracy of the abnormality determination.

Further, when the accelerator pedal operation amount AP indicative of the acceleration intention of the driver of the engine 1 is in the vicinity of "0", the allowable torque TRQLMH is set to a sum of the first predetermined torque TRQR1 and the second predetermined amount DTC2 which corresponds to the decelerating condition predetermined amount. When the driver has no acceleration intention, the engine operating condition is comparatively stable, and the target torque TRQCMD takes a negative value near "0". Accordingly, by setting the margin for preventing erroneous determination to the decelerating condition predetermined amount (DTC2), it is possible to perform the abnormality determination with high accuracy.

Further, when the accelerator pedal operation amount AP is equal to or greater than the first operation amount threshold value APL, the allowable torque TRQLMH is calculated by adding the first predetermined amount DTC1 to the target torque TRQCMD (FIG. 12, steps S61-S63), the first predetermined amount DTC1 being greater than the second predetermined amount DTC2 corresponding to the decelerating condition predetermined amount. When the driver has acceleration intention, the stability of the engine operating condition becomes lower compared with the condition where the accelerator pedal operation amount AP is in the vicinity of "0". Accordingly, calculating the allowable torque TRQLMH by adding the second predetermined amount DTC1, which is greater than the second predetermined value DTC2, to the target torque TRQCMD can prevents erroneous determination.

Further, when the accelerator pedal operation amount AP is equal to or greater than the first operation amount threshold value APL and less than the second operation amount threshold value APM, and the target torque TRQCMD is greater than the second predetermined torque TRQR2, the basic allowable torque TRQLMB is set to the second predetermined torque TRQR2, and the second predetermined torque TRQR2 is set to a value which is greater than the average value of the target torque TRQCMD corresponding to the second operation amount threshold value APM (FIG. 12, steps S57-S59). Since the fourth predetermined amount DTC4 (step S60) is set to a value near "0" as described above, the allowable torque TRQLMH (=TRQLMB+DTC4) is substantially equal to the basic allowable torque TRQLMB. Accordingly, when the target torque TRQCMD exceeds the second predetermined torque TRQR2, by determining that there is high possibility that an abnormality exists in calculation of the target torque TRQCMD, and setting the allowable torque TRQLMH to the second predetermined torque TRQR2 (or a value substantially equal to the second predetermined torque TRQR2), it is possible to avoid erroneous determination caused by setting the allowable torque TRQLMH according to the target torque TRQCMD.

Further, the rotational speed change amount DNE is detected, and when the rotational speed change amount DNE exceeds the predetermined threshold value DNETH, the process of FIG. 11 immediately ends, and the abnormality determination is not performed. In the case such as the rotational speed change amount DNE exceeds the predetermined threshold value DNETH, for example, when the engine 1 is being started, or racing of the engine 1 is performed, the determination cannot be performed accurately. Accordingly, erroneous determination is avoidable by inhibiting the determination.

In this embodiment, the process of FIG. 12 corresponds to the allowable torque calculating means, step S43 of FIG. 11 corresponds to the third determination means, and the engine rotational speed NE sensor 101 and step S40 of FIG. 11 correspond to the acceleration detecting means.

The present invention is not limited to the embodiment described above, and various modifications may be made. For example, the prime mover is an internal combustion engine in the above-described embodiments. Alternatively, the present invention is applicable to a drive control apparatus for a hybrid vehicle provided with an internal combustion engine and a motor (electric motor) as prime movers, as shown in FIG. 14, or an electrically-driven vehicle provided with a motor only.

In the example shown in FIG. 14, an electric motor (hereinafter referred to as "motor") 7 which can operate as a motor and an electric generator, is provided so as to drive an input shaft of the transmission 2. The motor 7 is connected to a power drive unit (hereinafter referred to as "PDU") 201, and the PDU 201 is connected to a battery 202 and an ECU 100a.

The ECU 100a performs a drive control of the engine 1 and the motor 7 so that the drive torque output from the engine 1 and/or the motor 7 coincides with the target torque TRQCMD. In this modification, a difference between the target torque TRQCMD and a sum of the estimated output torque TRQE of the engine 1 and the estimated output torque TRQM of the motor 7, is calculated as the torque difference DTRQ.

Further, in the first to third embodiments described above, the abnormality occurrence determination is fixed when both of the determination results of the first determination process and the second determination process indicate that an abnormality has occurred. Alternatively, the abnormality occurrence determination may be fixed only by the first determination process. Further, in the fourth embodiment, the abnormality occurrence determination may be fixed only by the first determination process if the answer to step S43 in FIG. 11 is affirmative (YES) (TRQE>TRQLMH).

Further, in above-described embodiments, the accumulated value SUMDTRQ of the torque difference DTRQ itself is used as a parameter which approximates the time-integrated value of the torque difference DTEQ, since the calculation period DT is constant. If the calculation period DT is not constant, the accumulated value obtained by accumulating a product of the torque difference DTRQ and the calculation period DT may be used as a parameter which approximates the time-integrated value of the torque difference DTRQ.

Further, as a device for inputting the acceleration intention of the driver, not only the accelerator pedal but an input device with a manual lever and the like can be used. In such case, an operation amount of the manual lever is used as the acceleration operation amount.

DESCRIPTION OF REFERENCE NUMERALS

1 Internal Combustion Engine (Prime Mover)
2 Transmission
6 Drive Wheel
11 Actuator
12 Fuel Injection Valve
13 Spark Plug
100 Electronic Control Unit (output torque control means, abnormality determining means, estimated output torque calculating means, accumulated value calculating means, first determining means, determination time period calculating means, second determining means, correction coefficient calculating means, correcting means, control calculation means, relevant device abnormality determining means, allowable torque calculating means, third determining means, acceleration detection means)

| 101 | Engine Rotational Speed Sensor (acceleration detection means) |
| --- | --- |
| 102 | Accelerator Pedal Sensor |
| 103 | Throttle Valve Opening Sensor |
| 104 | Intake Air Flow Rate Sensor |

The invention claimed is:

1. A drive control apparatus for a prime mover, including:
output torque control means for calculating a target torque which is a target value of an output torque of said prime mover for driving a vehicle, and performing an output torque control so that the output torque of said prime mover coincides with the target torque,
wherein said output torque control means includes an actuator for changing the output torque of said prime mover; and
abnormality determining means for determining an abnormality of said output torque control means,
said drive control apparatus being characterized by including:
estimated output torque calculating means for calculating an estimated output torque which is an estimated value of an actual output torque of said prime mover;
torque difference accumulated value calculating means for calculating a torque difference accumulated value which approximates a time-integration value of a torque difference between the target torque and the estimated output torque;
correction coefficient calculating means for calculating a correction coefficient according to the torque difference, the correction coefficient being relative to a characteristic of a drive power train which transmits the output torque of said prime mover to driving wheels of said vehicle; and
correcting means for calculating a corrected torque difference by multiplying the correction coefficient with the torque difference,
wherein said abnormality determining means includes first determining means for determining that an abnormality has occurred in said output torque control means when the torque difference accumulated value exceeds a determination threshold value which is set to a constant value,
wherein the torque difference accumulated value is calculated by accumulating a value obtained by multiplying the torque difference and a period of calculating the torque difference, a value calculated at the beginning of the period of calculation being applied as the torque difference,
wherein said torque difference accumulated value calculating means calculates the torque difference accumulated value by accumulating the corrected torque difference, and
wherein the correction coefficient is set to a value which is less than "1" when the torque difference is greater than a predetermined upper limit value, and when the torque difference is less than a predetermined lower limit value.

2. The drive control apparatus according to claim 1, wherein said abnormality determining means includes:
determination time period setting means for setting a determination time period according to the torque difference; and
second determining means for determining that an abnormality has occurred in said output torque control means when a state where the torque difference is greater than a predetermined difference value continues for a time period which is equal to or longer than the determination time period,
wherein said abnormality determining means fixes an abnormality determination by adjusting a final determination result when both of said first and second determining means determine that the abnormality has occurred.

3. The drive control apparatus according to claim 2, wherein said second determining means uses a minimum value of the determination time period for the determination when the determination time period changes corresponding to a change in the torque difference.

4. The drive control apparatus according to claim 1, wherein said output torque control means includes an actuator for changing the output torque of said prime mover; detecting means for detecting operation parameters indicative of an operating condition of said actuator and an acceleration operation amount of said vehicle; and control calculation means for outputting an actuation signal according to the operation parameters detected by said detecting means, the actuation signal actuating said actuator, wherein said abnormality determining means determines an abnormality in a calculation performed by said control calculation means, and relevant device abnormality determining means is provided separately from said abnormality determining means, said relevant device abnormality determining means determining an abnormality except the abnormality in the calculation performed by said control calculation means.

5. The drive control apparatus according to claim 2, further including:

allowable torque calculating means for calculating an allowable torque according to an operating condition of said prime mover; and third determining means for determining that there exists a possibility that an abnormality has occurred in said output torque control means, when the estimated output torque exceeds the allowable torque, wherein when said third determining means determines that there exists the possibility that an abnormality has occurred in said output torque control means, the determination by said first determining means or the determination by said first and second determining means is performed.

6. The drive control apparatus according to claim 5, wherein when an acceleration operation amount indicative of the acceleration of said prime mover is "0", an allowable torque setting means sets the allowable torque to a decelerating condition predetermined amount.

7. The drive control apparatus according to claim 6, wherein said allowable torque calculating means calculates the allowable torque by adding an accelerating condition predetermined amount to the target torque, when the acceleration operation amount is equal to or greater than a first operation amount threshold value, in which the first operation amount threshold value is greater than "0", the accelerating condition predetermined amount being greater than the decelerating condition predetermined amount.

8. The drive control apparatus according to claim 7, wherein when the acceleration operation amount is equal to or greater than the first operation amount threshold value and less than a second operation amount threshold value which is greater than the first operation amount threshold value, and the target torque is greater than a predetermined torque threshold value, said allowable torque calculating means sets the allowable torque to the predetermined torque threshold value, and then the predetermined torque threshold value is subsequently set to a value which is greater than an average value of the target torque corresponding to the second operation amount threshold value.

9. The drive control apparatus according to claim 5, further including acceleration detecting means for detecting a rotational acceleration of said prime mover, wherein when the rotational acceleration exceeds a predetermined acceleration threshold value, the determination by said first and third determining means or the determination by said first, second, and third determining means is inhibited.

10. A drive control method for a prime mover, including the steps of:

a) calculating a target torque which is a target value of an output torque of said prime mover for driving a vehicle, and performing an output torque control so that the output torque of said prime mover coincides with the target torque, wherein calculating the target torque includes detecting operation parameters indicative of an operating condition of an actuator and an acceleration operation amount of said vehicle, said actuator changing the output torque of said prime mover; and b) determining an abnormality of the output torque control, said drive control method being characterized by further including the steps of:

c) calculating an estimated output torque which is an estimated value of an actual output torque of said prime mover;

d) calculating a torque difference accumulated value which approximates a time-integration value of a torque difference between the target torque and the estimated output torque;

e) calculating a correction coefficient according to the torque difference, the correction coefficient being relative to a characteristic of a drive power train which transmits the output torque of said prime mover to driving wheels of said vehicle; and f) calculating a corrected torque difference by multiplying the correction coefficient with the torque difference, wherein said step b) includes the step of b1) determining that an abnormality has occurred in the output torque control when the torque difference accumulated value exceeds a determination threshold value which is set to a constant value, wherein the torque difference accumulated value is calculated by accumulating a value obtained by multiplying the torque difference and a period of calculating the torque difference, a value calculated at the beginning of the period of calculation being applied as the torque difference, wherein the torque difference accumulated value is calculated in said step d) by accumulating the corrected torque difference, and wherein the correction coefficient is set to a value which is less than "1" when the torque difference is greater than a predetermined upper limit value, and when the torque difference is less than a predetermined lower limit value.

11. The drive control method according to claim 10, wherein said step b) includes the steps of:

b2) setting a determination time period according to the torque difference; and b3) determining that an abnormality has occurred in the output torque control when a state where the torque difference is greater than a predetermined difference value continues for a time period which is equal to or longer than the determination time period, wherein the abnormality determination is fixed by adjusting a final determination result when the determination that the abnormality has occurred is made in both of said steps b1) and b3).

12. The drive control method according to claim 11, wherein the minimum value of the determination time period is used for the determination in said step b3) when the determination time period set in said step b2) changes corresponding to a change in the torque difference.

13. The drive control method according to claim 10, wherein said step a) includes the steps of:

a1) detecting operation parameters indicative of an operating condition of an actuator and an acceleration operation amount of said vehicle, said actuator changing the output torque of said prime mover;

a2) outputting an actuation signal according to the detected operation parameters, the actuation signal actuating said actuator, wherein an abnormality in the calculation performed in said step a2) is determined in said step b), and another step of g) determining an abnormality except the abnormality in the calculation performed in said step a2), is included separately from said step b).

14. The drive control method according to claim 11, further including the steps of:

h) calculating an allowable torque according to an operating condition of said prime mover; and i) determining that there exists a possibility that an abnormality has occurred in said output torque control, when the estimated output torque exceeds the allowable torque, wherein when it is determined in said step i) that there exists the possibility that an abnormality has occurred in the output torque control, the determination by said step b1) or the determination by said steps b1) and b3) is performed.

15. The drive control method according to claim 14, wherein when an acceleration operation amount indicative of the acceleration of said prime mover is "0", the allowable torque is set to a decelerating condition predetermined amount in said step h).

16. The drive control method according to claim 15, wherein the allowable torque is calculated in said step h) by adding an accelerating condition predetermined amount to the target torque, when the acceleration operation amount is equal to or greater than a first operation amount threshold value which is greater than "0", the accelerating condition predetermined amount being greater than the decelerating condition predetermined amount.

* * * * *